United States Patent
Meir

(10) Patent No.: US 8,856,573 B2
(45) Date of Patent: Oct. 7, 2014

(54) SETTING A NUMBER (N) OF FAST TRAINING SEQUENCES (FTS) AUTOMATICALLY TO AN OPTIMAL VALUE

(75) Inventor: Alon Meir, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 267 days.

(21) Appl. No.: 13/534,568

(22) Filed: Jun. 27, 2012

(65) Prior Publication Data

US 2014/0006675 A1    Jan. 2, 2014

(51) Int. Cl.
G06F 1/12 (2006.01)
G06F 1/32 (2006.01)
G06F 1/00 (2006.01)
G06F 13/42 (2006.01)

(52) U.S. Cl.
USPC ............ 713/324; 713/320; 713/375; 710/106

(58) Field of Classification Search
USPC .................... 713/300, 320, 322–324, 375; 710/104–106
See application file for complete search history.

(56) References Cited

U.S. PATENT DOCUMENTS

| | | | |
|---|---|---|---|
| 7,178,045 B2 | 2/2007 | Puffer et al. | |
| 7,626,418 B1 * | 12/2009 | Kolze et al. | 326/39 |
| 7,925,913 B1 * | 4/2011 | Vijayaraghavan et al. | 713/500 |
| 2004/0103333 A1 | 5/2004 | Martwick et al. | |
| 2007/0112996 A1 | 5/2007 | Manula et al. | |
| 2007/0150762 A1 | 6/2007 | Sharma et al. | |
| 2009/0323722 A1 * | 12/2009 | Sharma | 370/470 |
| 2010/0250915 A1 * | 9/2010 | La Fetra | 713/100 |
| 2011/0208913 A1 | 8/2011 | Suzuki et al. | |

OTHER PUBLICATIONS

Budruk, Ravi et al. "PCI Express System Architecture". 2003. Mindshare, Inc. Addison-Wesley Developer's Press. pp. 109-110 and 499-504.*
International Searching Authority, "Notification of Transmittal of the International Search Report and the Written Opinion of the International Searching Authority," mailed Oct. 18, 2013, in International application No. PCT/US2013/046610.
Debendra Das Sharma, "PCIe Express, PCI SIG, PCIe 2.0 Logical Extensions," 2005, 34 pages.

* cited by examiner

Primary Examiner — Thomas J Cleary
(74) Attorney, Agent, or Firm — Trop, Pruner & Hu, P.C.

(57) ABSTRACT

Embodiments of the present disclosure provide a PCIe interface module and a physical layer to negotiate a link by exchanging a number of fast training sequences (N_FTS). The physical layer may count the number of good FTSs exchanged during an initial or a subsequent link training. The number of FTSs to be exchanged during a subsequent link training may be a number in which a maximum initial number of fast training sequences to be exchanged is reduced by the number of good FTSs exchanged during the initial link training, reducing link training time and increasing efficiency.

21 Claims, 8 Drawing Sheets

US 8,856,573 B2

SETTING A NUMBER (N) OF FAST TRAINING SEQUENCES (FTS) AUTOMATICALLY TO AN OPTIMAL VALUE

FIELD OF THE INVENTION

The present disclosure relates generally to interconnect structures, and more particularly, a method of training links between Peripheral Component Interconnect Express (PCIe) components.

BACKGROUND

The Peripheral Component Interconnect Express (PCI Express™ (PCIe™)) protocol in accordance with links based on the PCI Express™ Specification Base Specification version 2.0 (published Jan. 17, 2007) (hereafter the PCIe™ Specification) is a computer expansion bus standard that offers many improvements over the prior bus standards. These improvements include input/output (I/O) hardware virtualization, higher maximum system bus throughput, lower I/O pin count and smaller physical footprint, better performance-scaling for bus devices, and detailed error detection and reporting mechanisms. The PCIe electrical interface is used in consumer, server, and industrial applications, to link motherboard-mounted peripherals as a passive backplane interconnect and as an expansion card interface for optional expansion components.

The PCIe bus serves as the primary motherboard-level interconnect, connecting the host system processor with both integrated peripherals and add-on peripherals (expansion cards.) In most computing systems, the PCIe bus co-exists with one or more legacy buses.

Older interface bus clocking schemes limit the bus clock to the slowest peripheral on the bus (regardless of the devices involved in the bus transaction). In contrast, the PCIe bus link supports full-duplex communication between any two endpoints, with no inherent limitation on concurrent access across multiple endpoints.

The PCIe bus protocol encapsulates communications within packets. The work of packetizing and de-packetizing data and status-message traffic is handled by the transaction layer of the PCIe port. PCIe devices communicate via logical connections or link. A link is a point-to-point communication channel between two PCIe ports, allowing both to send/receive ordinary PCI-requests and interrupts. At the physical level, a link is composed of 1 or more lanes. Low-speed peripherals use a single-lane (×1) link, while high speed peripherals, such as a graphics card, typically uses a much wider multi-lane link.

DETAILED DESCRIPTION

Embodiments of the present disclosure provide a Peripheral Component Interconnect Express (PCIe) interface module with a reduced link initialization time and allow for improved efficiency. The PCIe interface module couples a device such as a processor to other PCIe components. This PCIe interface module has an architecture comprising a transaction layer, a data layer and a physical layer. The transaction layer and data layer form packets that carry data between the processor and other PCIe components.

Link negotiation is usually done the first time a link is constructed. It is done using training sequence ordered sets TS1 and TS2 (16 symbol) sequences. Similar training (but not negotiating of link parameters) is done on a link low power state exit (e.g., from a L1 low power state), also using TS1 and TS2. Both of this cases are full duplex, and the training is done using a handshake between the two link partners. On a standby low power state (e.g., L0s, which is not as deep as L1) exit, link training is done with a smaller fast training sequences of 4 symbols, called FTS. Since L0s can be entered by each link partner transmitter without relation to the other side's power state, there is no handshake-like training, and the transmitter side does not know if the receiver connected to it is locked. Therefore the receiver provides the transmitter the number of FTSs it requires for lock. This number is called N_FTS. According to the PCIe Specification, N_FTS is communicated between both link sides during link negotiation (using TS1 and TS2 during the link up process). It may be updated in a RECOVERY link state (where TS1 and TS2 are transmitted and received when the link is already up).

In various embodiments, a physical layer may count the number good FTSs exchanged during an initial or a subsequent training of a link between PCIe components. The number of FTSs to be exchanged during subsequent link training may be a number in which a maximum initial number of FTS to be exchanged is reduced based upon the number of good FTSs exchanged during one or more analyzed link training sequences. This reduces link training time and increases efficiency.

The PCIe link is built around point-to-point connections known as lanes. This is in contrast to the earlier PCI bus connection, which is a bus-based system where all the devices share the same bidirectional, 32-bit or 64-bit parallel bus.

Figure 1:
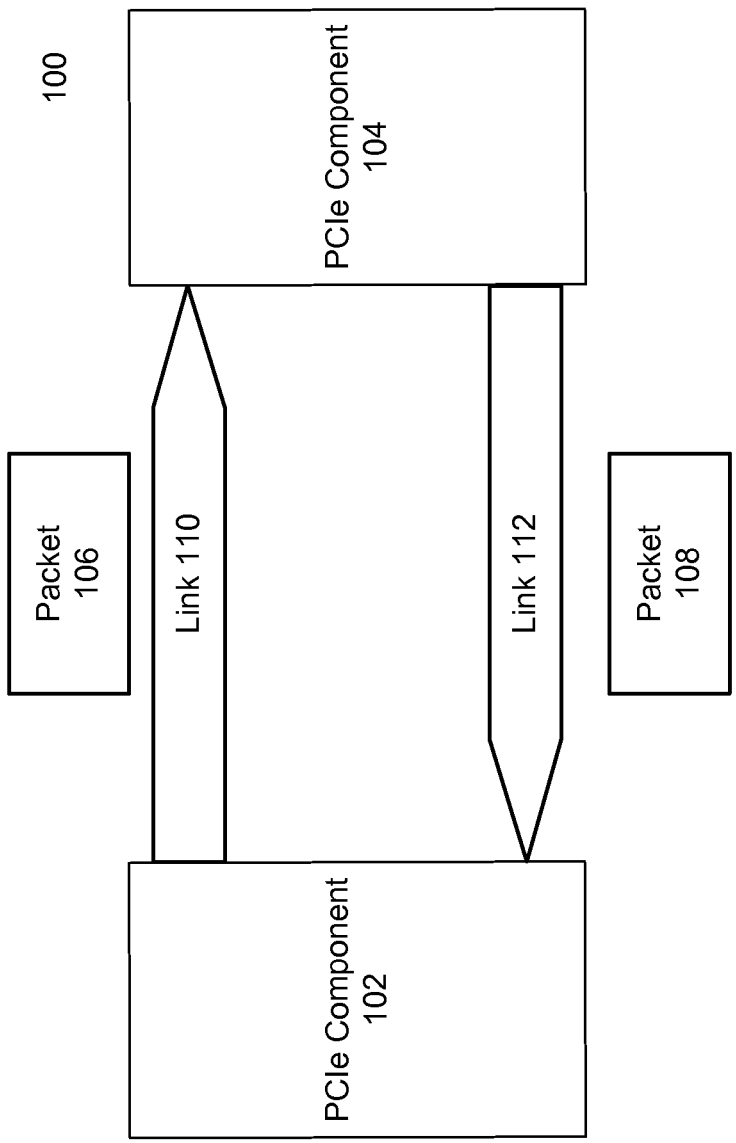
FIG. 1 is a block diagram of a PCIe Link 100 between PCIe component 102 and component 104 associated with embodiments of the present disclosure.

FIG. 1 is a block diagram associated with a PCIe link 100 established between PCIe component 102 and component 104. PCIe link 100 includes at least two PCIe components (shown as PCIe component 102 and PCIe component 104), data packets to be exchanged between the at least two PCIe components (shown as packet 106 and packet 108), and a pair of uni-directional communication pathways between the at least two PCIe components (shown as link 110 and link 112). The fundamental PCIe link includes two low-voltage differential driven signal pairs, a transmit pair and receive pair, on these pathways which exchange packets. After initialization each link operates at a supported signaling level. This link supports at least one lane, where each lane represents a set of differential signal pairs on the pathways 108 indicated by the pair of uni-directional differential links used to exchange packets between PCIe components 102 and 104.

Figure 2:
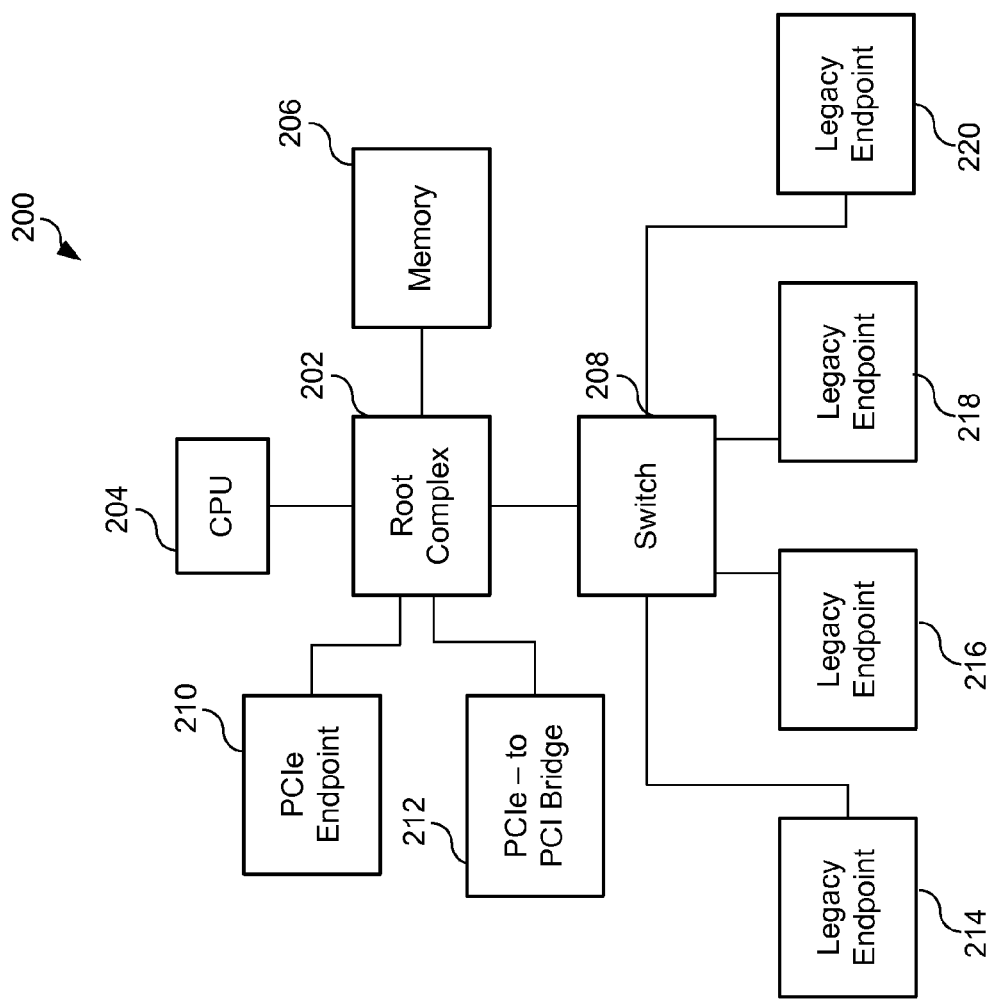
FIG. 2 is a block diagram associated with the PCIe topology associated with embodiments of the present disclosure.

FIG. 2 provides a block diagram associated with the PCIe topology associated with an embodiment of the present disclosure. Topology 200 comprises a fabric having multiple point-to-point links that interconnect a set of components. Specifically, FIG. 2 depicts a topology including root complex 202 and multiple PCIe endpoints. These PCIe endpoints include CPU 204, memory 206, switch 208, PCIe endpoint 210 and PCIE to PCI/PCIX bridge 212. Switch 208 may further be used to couple the root complex 202 to legacy endpoints 214, 216, 218 and 220.

Figure 3:
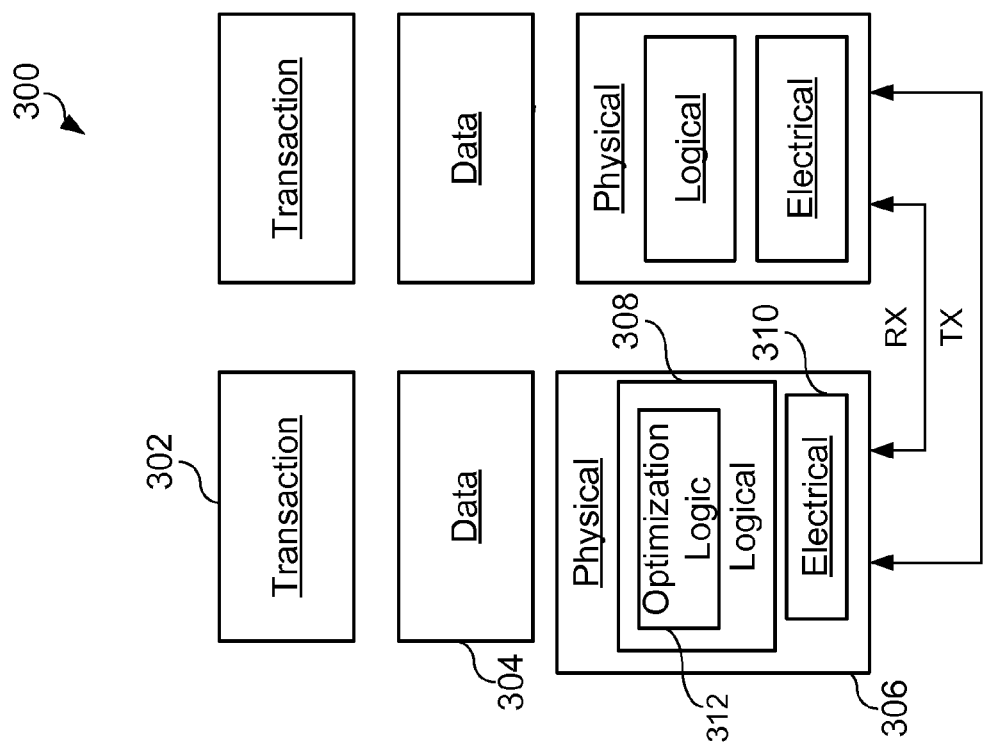
FIG. 3 is a block diagram of the architecture of the PCI Express protocol associated with embodiments in the present disclosure.

FIG. 3 is a block diagram associated with the architecture of the PCI Express associated with embodiments in the present disclosure. This architecture may be described in terms of three layers, the transaction layer, data layer and physical layer. Layers 300 include transaction layer 302, data layer 304, and physical layer 306. Each of these layers is divided into two sections, a first section to process outbound packets that contain transmitted information, and a second section to process inbound information.

PCIe is a layered protocol including a transaction layer 302, data layer 304, and physical layer 306. The data layer 304 is subdivided to include a media access control (MAC) sublayer. PCIe uses packets to communicate information between components. Packets are formed in the transaction and data layers to carry the information from the transmitting component to the receiving component. As the transmitted packets flow through the other layers, the transmitted packets are extended with additional information to handle packets at those layers. At the receiving side the reverse process occurs and packets are transformed from a physical layer representation to the data layer representation and finally into a form that can be processed by the transaction layer 302 of the receiving device.

The upper layer of the architecture is the transaction layer 302. The transaction layer's primary responsibility is the assembly and disassembly of transaction layer packets (TLPs). TLPs are used to communicate transactions, such as read and write, as well as certain types of events. The transaction layer is also responsible for managing credit-based flow control for TLPs.

Request packets requiring a response packet are implemented as a split transaction. Each packet has a unique identifier that enables response packets to be directed to the correct originator. The packet format supports different forms of addressing depending on the type of the transaction (Memory, I/O, Configuration, and Message).

The middle layer in the stack is the data layer 304. Data layer 304 serves as an intermediate stage between the transaction layer and the physical layer. The primary responsibilities of the data layer include link management and data integrity, including error detection and error correction.

The transmission side of data layer 304 accepts TLPs assembled by the transaction layer 302, calculates and applies a data protection code and TLP sequence number, and submits them to physical layer 306 for transmission across the link. The receiving data layer 304 checks the integrity of received TLPs and for submitting them to the transaction layer 302 for further processing. On detection of TLP error(s), this layer is responsible for requesting retransmission of TLPs until information is correctly received, or the link is determined to have failed.

Data layer 304 also generates and consumes packets that are used for link management functions. To differentiate these packets from those used by the transaction layer (TLP), the term data layer packet (DLLP) will be used when referring to packets that are generated and consumed at the data layer.

Physical layer 306 is further divided into logical module 308 and electrical module 310, where physical layer 306 includes all circuitry for interface operation, including driver and input buffers, parallel-to-serial and serial-to-parallel conversion, PLL(s), and impedance matching circuitry. Physical layer 306 performs logical functions with logical module 308 related to interface initialization and maintenance. Logical module 308 further includes an optimization logic module 312 which can be used to perform the functions and processes described herein. Physical layer 306 exchanges information with the data layer 304 in an implementation-specific format. Physical layer 306 is responsible for converting information received from the data layer 304 into an appropriate serialized format and transmitting it across the PCIe link at a frequency and width compatible with the device connected to the other side of the link.

Physical layer 306 is subdivided into logical sublayer 308 and electrical sublayer 310. The logical sublayer is sometimes further divided into a MAC sublayer and a PCS. At electrical level 310, each lane includes two unidirectional pairs. Transmit and receive are separate differential pairs, for a total of four data wires per lane. A connection between any two PCIe devices is known as a link, and is built up from a collection of one or more lanes. All devices minimally support single-lane (×1) link. Devices may optionally support wider links composed of 2, 4, 8, 12, 16, or 32 lanes.

The physical layer executes a first training (or series of trainings) and a second training in accordance with accordance with an embodiment of the present disclosure. The first training may be used to optimize subsequent trainings. In general, to train the link on exit from a low power state training sequences are used, not to negotiate information, but to train the receiver to be able to receive new data reliably. TS1/2 are used on an L1 exit, and FTSs are used on L0s exit. There is another state that passes TS1/2 on both receive and transmit lines. This RECOVERY state is a shortened training done on the link without a low power state exit. A PHY enters this mode as determined, e.g., when there are too many errors or in other cases. In various embodiments this RECOVERY state can be used to re-negotiate the N_FTS, which is allowed to change in the RECOVERY state.

Figure 4:
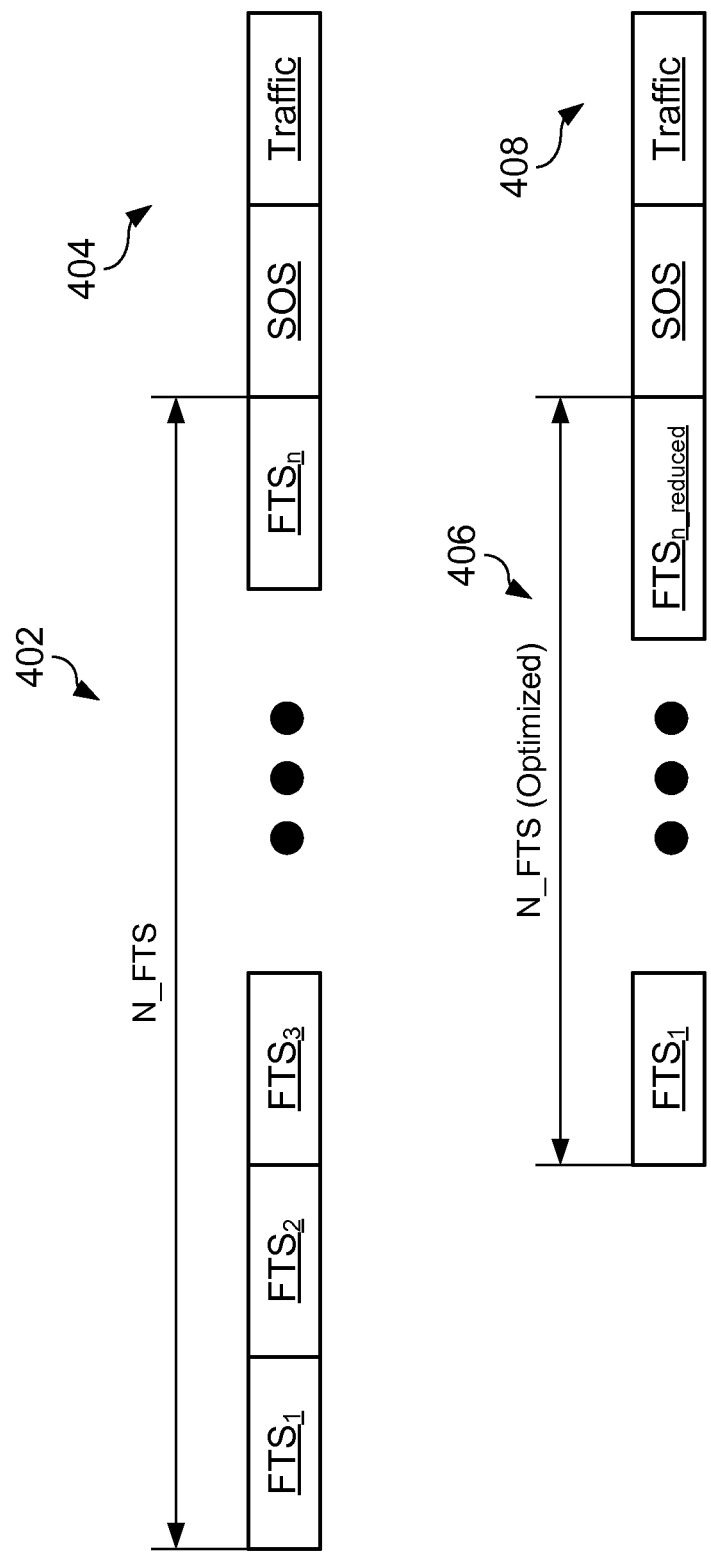
FIG. 4 is a timing diagram associated with training a link in accordance with an embodiment of the present disclosure.

During the first training when exiting a link standby low power state, a number of FTS are exchanged within the link. FIG. 4 is a timing diagram associated with training a link in accordance with an embodiment of the present disclosure. After waking from a L0s state to the L0 state, a transmitter sends certain information to train the link. A number of FTSs are shown as FTSs 402 in FIG. 4 which is used to establish a link prior to exchanging data traffic 404. Following the appropriate number of FTSs that allow synchronization to occur and one skip ordered set (SOS), traffic 404 may then be exchanged between PCIe link components. This initial number of FTSs (N_FTS) may be conservatively selected in order to ensure synchronization. On a second or subsequent training, the number of FTSs 406 is reduced as will be described with reference to FIG. 5. This reduced synchronization time increases efficiency in establishing subsequent links. Following the subsequent training with FTSs 406, data traffic 408 is then exchanged between the PCIe link components.

Training sequences are composed of ordered sets used for initializing bit alignment, symbol alignment and to exchange physical layer parameters. Training sequences (TS1 or TS2) are transmitted consecutively. Fast training sequence (FTS) is the mechanism that is used for bit and symbol lock when transitioning from a standby state (e.g., L0s) to a normal operating state (e.g., L0). The FTS is used by the receiver to detect the exit from electrical idle and align the receiver's bit/symbol receive circuitry to the incoming data.

During negotiation, each PCIe device sends to the other end how much time it takes the receiver to exit L0s. This time is determined by the number of FTSs. When a transmitter exits L0s, the transmitter sends to its PCIe link partner FTS×N times to let the connected receiver synchronize on the clock and data, and then the transmitter can transmit a packet, assuming the receiver of the other side is ready.

Embodiments of the present disclosure determine the value of N_FTS and store this value to memory. In prior solutions, the value of N_FTS was the same in all systems (links). Therefore the N_FTS value had to be the largest possible value to allow successful L0s exit in all systems, but the smallest possible to reduce impact on the performance.

Embodiments of the present disclosure allow the value of N_FTS to be much smaller than previously used in systems having good data integrity, thus allowing for performance improvement.

PCIe negotiates the highest mutually supported number of lanes. Many graphics cards, motherboards and BIOS versions are verified to support ×1, ×4, ×8 and ×16 connectivity on the same connection. Data transmitted on multiple-lane links is interleaved, meaning that each successive byte is sent down successive lanes. While requiring significant hardware complexity to synchronize (or deskew) the incoming data, this interleaving can significantly reduce the latency.

Like other high data rate serial interconnect systems, PCIe has a protocol and processing overhead due to the additional transfer robustness. Long continuous unidirectional transfers (such as those typical in high-performance storage controllers) can approach >95% of PCIe's raw (lane) data rate. These transfers also benefit the most from increased number of lanes (×2, ×4, etc.) But in more typical applications (such as a USB or Ethernet controller), the traffic profile is characterized as short data packets with frequent enforced acknowledgements. This type of traffic reduces the efficiency of the link, due to overhead from packet parsing and forced interrupts (either in the device's host interface or the CPU). Being a protocol for devices connected to the same printed circuit board, it does not require the same tolerance for transmission errors as a protocol for communication over longer distances, and thus, this loss of efficiency is not particular to PCIe.

Figure 5:
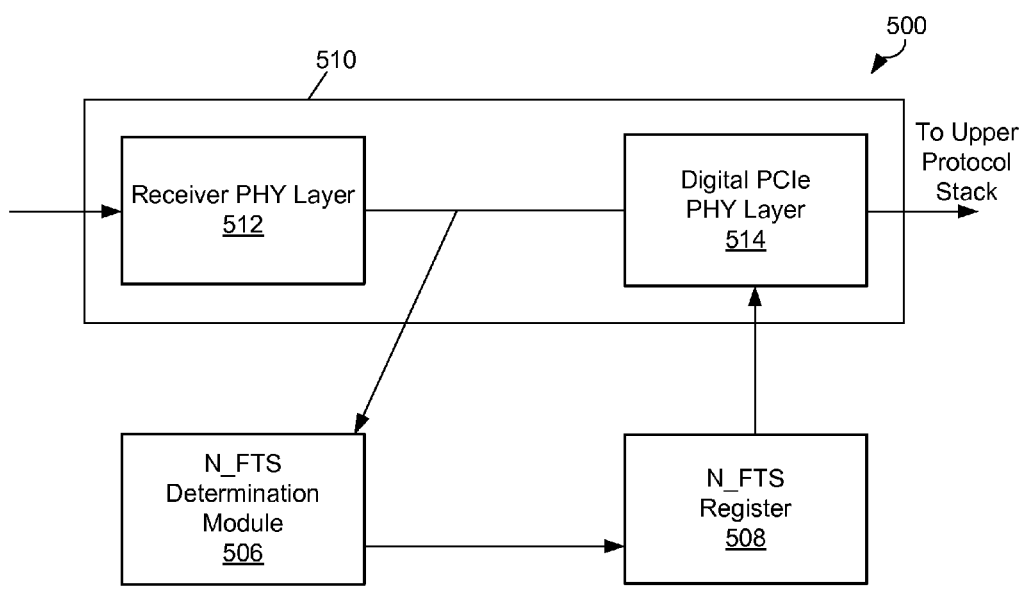
FIG. 5 is a block diagram of receiver logic in accordance with one embodiment of the present invention.

FIG. 5 is a block diagram associated with link training between PCIE devices in accordance with embodiments of the present disclosure. A receive logic 500 may be associated with a device of a system that receives incoming information via a link, e.g., as incoming serial information receive via a differential signal pair. As seen, this incoming data stream may be provided to a physical layer 510, which generally includes a receiver PHY layer 512, and a digital PHY layer 514. In general, receiver PHY layer 512 may include a portion of PHY circuitry that receives incoming differential serial data, converts it to parallel data, performs other processing to obtain raw receive data, such as comma alignment and so forth, and provides aligned received data to digital PHY layer 514. As further seen, this aligned received data may be provided to a N_FTS determination module 506 that in turn is in communication with a N_FTS register 508 which, as described may store a N_FTS value that in turn can be provided to digital PHY layer 514 for more efficiently performing link trainings to thus more rapidly train the link and provide useful data to upper layers of a protocol stack which generally may include a data layer and a transaction layer, along with other logic of the receiver, which in an embodiment can be one or more cores of a multi-core processor.

During link training, incoming data (FTSs) may be communicated as part of the exchange of information. During this link training, a number of FTSs may be communicated with which the devices are synchronized (e.g., bit lock, symbol lock, and lane-to-lane deskew). In general, determination module 506 may determine the number of FTSs (N_FTS) exchanged during link training that are sufficient to establish the link. Initially, this value may be conservatively large to ensure that a link is established. Hereafter, this value may be reduced during subsequent link trainings, as discussed above and with reference to FIG. 6, in order to improve system efficiency by reducing training time.

The N_FTS value may be stored to register 508 by determination module 506. The value of N_FTS is read from memory by digital physical layer 514 prior to link negotiation, and used during link training. By optimizing N_FTS with determination module 506, the actual number of FTSs exchanged during link training may be reduced. The reduced N_FTS value is used in future link trainings and results in a faster and more efficient link training.

Figure 6:
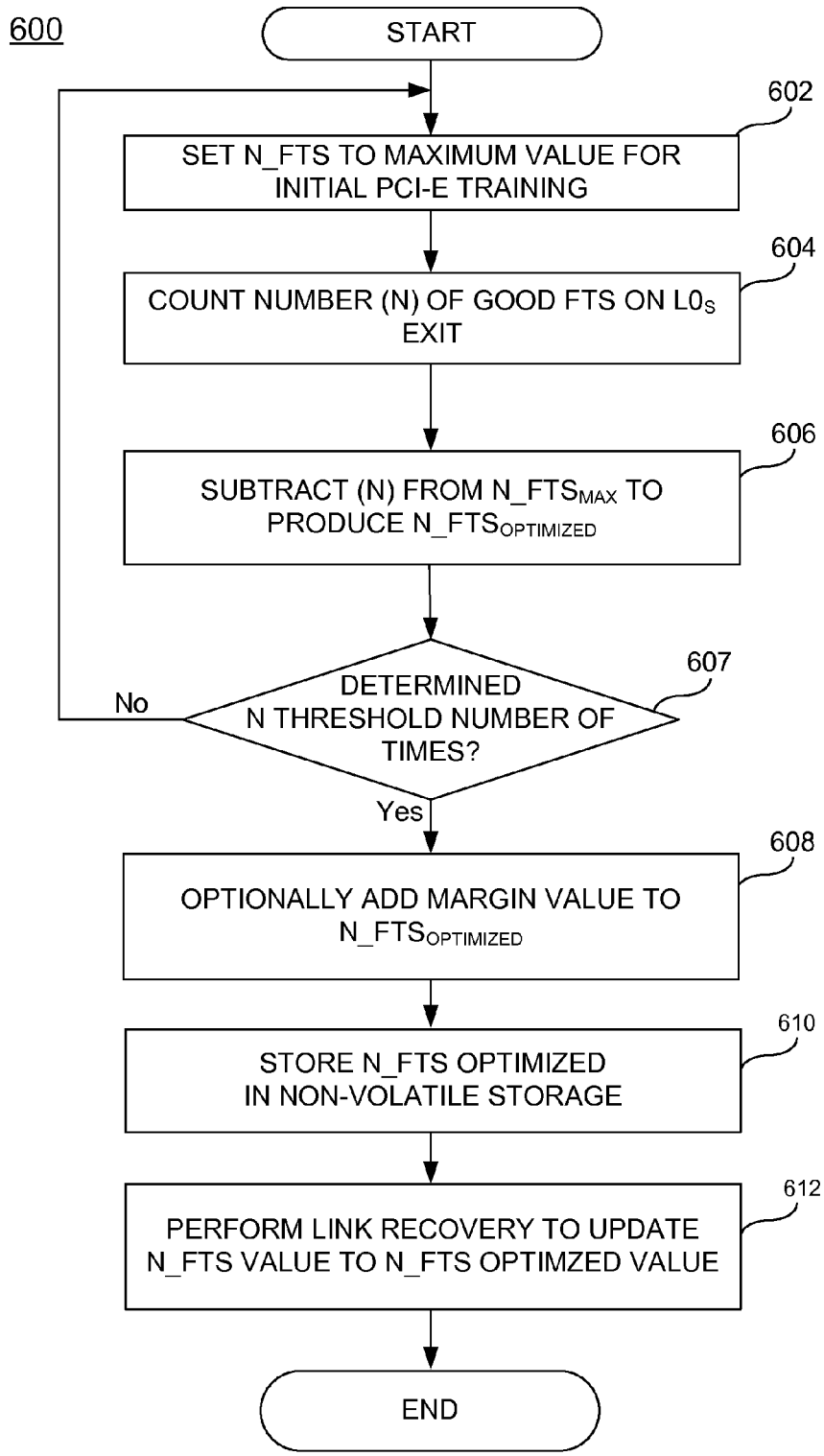
FIG. 6 is a flow diagram of a method in accordance with one embodiment of the present invention

FIG. 6 is a logic flow diagram associated with processes and methods of embodiments of the present disclosure. Operations 600 are associated with the training of links between PCIe components during PCIe link training. Operations 600 begin with block 602 where the number of FTS to be exchanged during link training is set to a predetermined or maximum value. This number allows the PCIe devices to ensure an exit from an L0s state to a L0 state. The L0s state is intended to be a power saving state. This L0s state allows a link to quickly enter and recover from power conservation without complete recovery. The L0 state is the normal operational state where data and control packets may be transmitted and received. To exit L0s to L0 involves reestablishing bit lock, symbol lock, and lane-to-lane de-interleaving. On L0s exit, no FTSs will pass from the receiver block to the digital block until the receiver has been fully locked. When locked the receiver will pass to the digital block data that includes the last FTS received.

In block 604, following the initial L0s exit, the number of good FTSs that the receiver block passes to the digital block is counted. Since these FTSs are good data, the receiver block has been synchronized and does not require this number of FTSs in order to establish lock. In block 606 the number of received FTSs in the digital block is subtracted from the maximum N_FTS value used in block 602 in order to provide a new optimal N_FTS to be provided to the receiver for future L0s exits.

This process including steps 602-606 may be repeated a number of times where the number of times (as determined at diamond 607), may be programmable. Also at this control block the largest number N_FTS value may be maintained such that the empirically determined optimal N_FTS is not determined by one training. In block 608 a programmable margin value (optionally) may be added such that the number of FTSs used may be greater than the number exactly needed. In block 610 this number of FTSs (N_FTS optimized) can be stored in non-volatile memory or storage to be used for future exits from L0s. Control then passes to block 612, where the link can enter into a recovery state in order to communicate this optimized N_FTS value to the link partner to enable it to exit L0s with a fewer number of FTSs.

Note that the process of FIG. 6 may iterate throughout operation of a system, as the monitoring of optimal N_FTS is always done. In other words, each time there is L0s exit, the number of good FTSs received after the receiver is locked is checked. If the number is too large, N_FTS can be reduced (depending on optimization registers that determine the threshold for updating N_FTS, and the number of times that this threshold is passed). If the number it is too small, N_FTS can be enlarged via a similar decision process.

Figure 7:
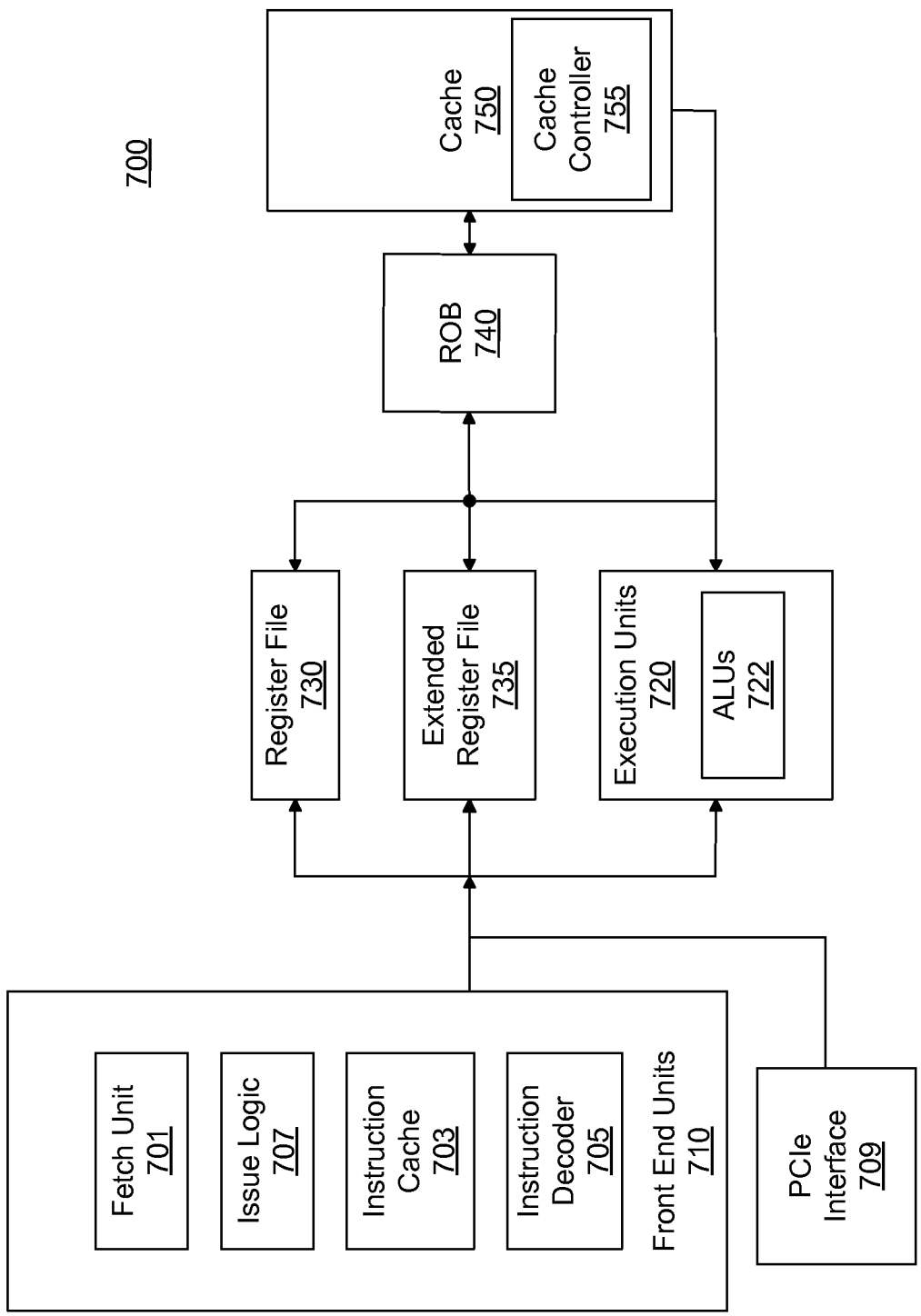
FIG. 7 is a flow diagram of a method in accordance with one embodiment of the present invention.

Referring now to FIG. 7, shown is a block diagram of a processor core in accordance with one embodiment of the present invention. As shown in FIG. 7, processor core 700 may be a multi-stage pipelined out-of-order processor, and may operate at different voltages and frequencies (both in and out of turbo mode). As seen in FIG. 7, core 700 includes front end units 710, which may be used to fetch instructions to be executed and prepare them for use later in the processor. For example, front end units 710 may include a fetch unit 701, an instruction cache 703, an instruction decoder 705, and issue logic 707. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor. PCIe interface 709 allows the CPU to link with other PCIe components as described with reference to FIGS. 1-6. In turn, issue logic 707 may schedule and issue instructions. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722, among other such execution units.

Results from the execution units may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. ROB 740 may handle other operations associated with retirement.

As shown in FIG. 7, ROB 740 is coupled to a cache 750 which, in one embodiment may be a low level cache (e.g., an L1 cache) although the scope of the present invention is not limited in this regard. As further seen, cache 750 can include (or be associated with) a cache controller 755. Also, execution units 720 can be directly coupled to cache 750. From cache 750, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a so-called x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
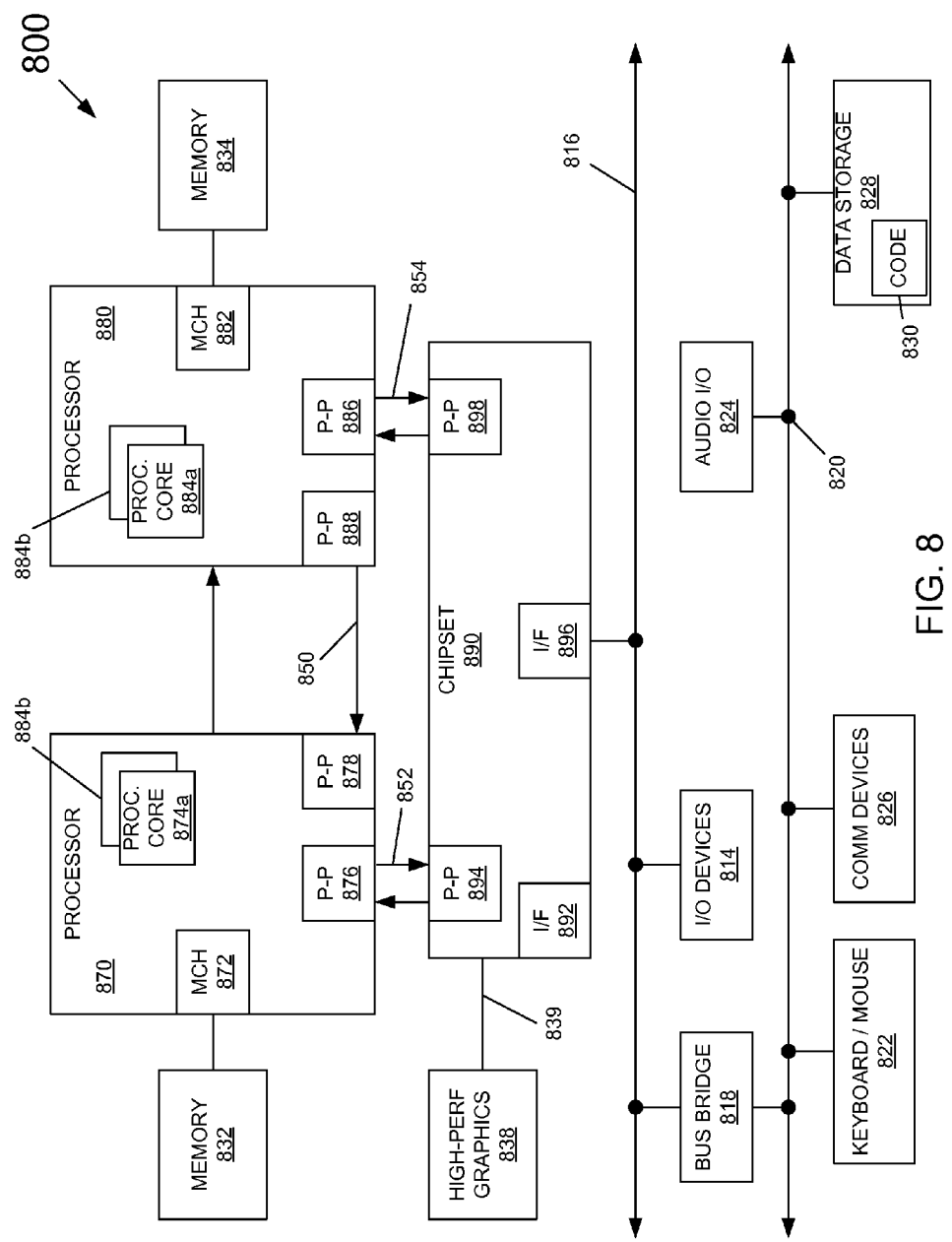
FIG. 8 is a block diagram of a processor core in accordance with one embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Each of the processors can include various hardware and/or logic to enable optimized link training, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, or so forth.

Embodiments of the present disclosure provide an interface module to couple a device to other components. This interface module has an architecture comprising a transaction layer, a data layer and a physical layer. The transaction layer and data layer form packets that carry data between the processor and other PCIe components. The physical layer may negotiate a link between the device and another PCIe component by exchanging a number of FTS (N_FTS). The physical layer may count the number of good FTSs exchanged during an initial or a subsequent link training between PCIe components. The number of FTSs to be exchanged during subsequent link training may be a number in which a maximum initial number of FTSs to be exchanged is reduced by the number of good FTSs exchanged during an initial link training. This reduces link training time and increases efficiency.

The number of FTSs to be exchanged during the subsequent link training may be increased to provide a margin to ensure the exchange of good FTSs prior to the exchange of data. Thus, the number of FTSs may be increased by a margin. Further the number of good FTSs exchanged during the initial link training may not be constant and therefore may be determined over a programmed number of initial link trainings such that the number of good FTSs exchanged may be set based on the minimum number of good FTSs observed in order to ensure achieving good FTS prior to the completion of link training.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a Peripheral Component Interconnect Express (PCIe) interface module to interface a processor to another PCIe component, the PCIe interface module comprising:
        a transaction layer;
        a data layer, the transaction layer and data layer to form packets that carry data between the processor and the other PCIe component;
        a physical layer, the physical layer to negotiate a link between the processor and the PCIe component by exchanging a number (N) of Fast Training Sequences (FTS), the physical layer to count a number of good FTSs exchanged during a first link training between the PCIe components, a number of FTSs to be exchanged during a subsequent link training to be N reduced by the number of good FTSs exchanged during the first link training.

2. The apparatus of claim 1, the number of FTSs to be exchanged during the subsequent link training to be increased by a margin of FTSs.

3. The apparatus of claim 1, the number of good FTSs exchanged during the first link training between the PCIe components to be determined over a programmed number of link trainings.

4. The apparatus of claim 1, the link training to occur during a change in link state from a low power state to an active state.

5. The apparatus of claim 1, the physical layer to monitor the number of good FTSs exchanged during subsequent link trainings.

6. The apparatus of claim 5, the physical layer to adjust the number of FTSs to be exchanged during subsequent link trainings based on the number of good FTSs exchanged during at least one of the subsequent link trainings.

7. The apparatus of claim 6, the physical layer to store the number of FTSs to be exchanged during the at least one of the subsequent link trainings to memory.

8. A system comprising:
    a multi-core processor including:
        an interface module to interface the multi-core processor to another component, the interface module comprising:
            a transaction layer;
            a data layer, the transaction layer and data layer to form packets that carry data between the multi-core processor and the other component;
            a physical layer, the physical layer to negotiate a link between the multi-core processor and the other component by exchanging a number (N) of Fast Training Sequences (FTS), the physical layer to count a number of good FTSs exchanged during a first link training between the multi-core processor and the other component, a number of FTSs to be exchanged during a subsequent link training to be N reduced by the number of good FTSs exchanged during the first link training.

9. The system of claim 8, the number of FTSs to be exchanged during the subsequent link training to be increased by a margin of FTSs.

10. The system of claim 8, the number of good FTSs exchanged during the first link training between the components to be determined over a programmed number of link trainings.

11. The system of claim 8, the link training to occur during a change in link state from a low power state to an active state.

12. The system of claim 8, the physical layer to monitor the number of good FTSs exchanged during subsequent link trainings.

13. The system of claim 12, the physical layer to adjust the number of FTSs to be exchanged during subsequent link trainings based on the number of good FTSs exchanged during at least one of the subsequent link trainings.

14. The system of claim 13, the physical layer to store the number of FTSs to be exchanged during the at least one of the subsequent link trainings to memory.

15. A method comprising:
    establishing an initial number (N) of Fast Training Sequences (FTSs) to be exchanged during an initial link training;
    performing the initial link training between a first component and a second component;
    counting a number of good FTSs exchanged during the initial link training; and
    setting a number of FTSs to be exchanged during a subsequent link training to be N reduced by the number of good FTSs exchanged during the initial link training.

16. The method of claim 15, further comprising increasing the number of FTSs to be exchanged during the subsequent link training by a margin of FTSs.

17. The method of claim 15, the number of good FTSs exchanged during the initial link training between the first and second components determined over a programmed number of initial link trainings.

18. The method of claim 15, further comprising changing a link state from a low power state to an active state.

19. The method of claim 15, further comprising monitoring a number of good FTSs exchanged during subsequent link trainings.

20. The method of claim 19, further comprising adjusting the number of FTSs to be exchanged during the subsequent link trainings based on the number of good FTSs exchanged during at least one of the subsequent link trainings.

21. The method of claim 20, further comprising storing the number of FTSs exchanged during the at least one of the subsequent link trainings to memory.

* * * * *